United States Patent [19]

Friese et al.

[11] Patent Number: 5,172,466

[45] Date of Patent: Dec. 22, 1992

[54] PROCESS FOR PRODUCING PTC TEMPERATURE SENSOR ELEMENTS FOR PTC TEMPERATURE SENSOR

[75] Inventors: Karl-Hermann Friese, Leonberg; Hans-Martin Wiedenmann, Stuttgart; Günther Stecher, Ludwigsburg, all of Fed. Rep. of Germany

[73] Assignee: Robert Bosch GmbH, Stuttgart, Fed. Rep. of Germany

[21] Appl. No.: 715,798

[22] Filed: Jun. 14, 1991

Related U.S. Application Data

[63] Continuation of Ser. No. 459,752, Jan. 10, 1990.

[30] Foreign Application Priority Data

Jan. 10, 1987 [DE] Fed. Rep. of Germany ....... 3733192

[51] Int. Cl.$^5$ .............................................. H01C 7/02
[52] U.S. Cl. ..................................................... 29/612
[58] Field of Search ............... 29/612, 611; 338/22 R, 338/225 D, 25; 374/185, 208

[56] References Cited

U.S. PATENT DOCUMENTS

| 4,634,837 | 1/1987 | Ito et al. ........................... 219/553 |
| 4,668,375 | 5/1987 | Kato et al. ......................... 361/411 |
| 4,697,165 | 9/1987 | Ishiguro et al. ....................... 338/34 |
| 5,057,811 | 10/1991 | Strott et al. ...................... 338/22 R |

Primary Examiner—P. W. Echols
Attorney, Agent, or Firm—Michael J. Striker

[57] ABSTRACT

A PTC temperature sensor and a process for producing PTC temperature sensing elements from ceramic films for a PTC temperature sensor are proposed. The PTC temperature sensing elements are so designed that the PTC resistor track is hermetically encapsulated with respect to the gas being measured and the ambient air. Ceramic films based on an insulator ceramic, in particular based on $Al_2O_3$, and ceramic films based on a solid electrolyte can be used to produce the temperature sensing elements. The PTC temperature sensor according to the invention is distinguished, in particular, by the fact that, while the manufacturing procedure is cheap, it is not subject to aging due to the effect of varying $O_2$ partial pressures, has a high resistance to aging of the resistance characteristic in rich and lean gas mixtures, for example in motor vehicle exhaust gases, at 300°-1000° C. and has a construction free from extraneous potential, is characterized by short response times owning to its low heat capacity and is suitable for incorportion in very narrow housing as a consequence of small dimensions.

8 Claims, 2 Drawing Sheets

PROCESS FOR PRODUCING PTC TEMPERATURE SENSOR ELEMENTS FOR PTC TEMPERATURE SENSOR

This is a division of application Ser. No. 459,752 filed Jan. 10, 1990.

BACKGROUND OF THE INVENTION

The invention relates to a PTC temperature sensor of the type which includes a PTC resistor connected to conductor webs disposed in a housing and also a process for producing PTC temperature sensing elements for the PTC temperature sensor.

It is generally known to use temperature sensors with temperature sensing elements containing thermally resistant resistor materials having temperature-dependent resistance values for measuring comparatively high temperatures such as prevail, for example, in exhaust gases from internal combustion engines (ef. E. D. Macklen, "Thermistors", published by Electrochemical Publications Ltd., 1979).

PTC temperature sensors utilize the continuous change in the resistance of metals or semiconductors having positive temperature coefficients with varying temperatures. The metals preferably used in PTC temperature sensors are platinum and nickel because of their high stability and reproducibility.

It is furthermore known, for example from EP-A-0,18,900 and 0,142,993 and also German Offenlengungsschrift 3,017,947 and 3,543,759, to use planar exhaust gas sensors, which can be prepared in a particularly cheap manner by ceramic film technology and screen printing technology, to determine the λ-value of gas mixtures. Disadvantages of the known PTC temperature sensors are the fact that they age too rapidly during use, that their response times are too long, their method of production is too expensive and/or their dimensions are too large. The unavoidable diffusion of compounds of the gas to be measured e.g. hydrogen through highly refractory metal housings or through glass envelopes, in particular, causes undesirable changes i the resistance values. Metallic PTC resistors are put at risk at high temperatures also by oxidation in particular.

SUMMARY OF THE INVENTION

The PTC temperature sensor according to the invention has the PTC sensing element which is encapsulated hermetically with respect to the gas being measured and the ambient air in a laminated composite of ceramic films. The invention has the advantage over known PTC temperature sensors that the temperature sensing element is not subject to any aging due to the influence of varying $O_2$ partial pressures while being cheap to manufacture, that it has a high resistance to changing the resistance characteristic in rich and lean gas mixtures, for example in motor vehicles exhaust gases at 300–1000° C. and that it free from extraneous potential, is characterized by short response times owing to its slow heat capacity and is suitable for incorporation in very narrow housings as a consequence of its small dimensions.

The temperature sensing element required for a PTC temperature sensor according to the invention can be produced by known laminating technology from comparatively thin ceramic films having a thickness of, in particular, 0.1 to 0.6 mm, preferably of 0.25 to 0.3 mm, which have previously been coated by known thick-film technologies with conductor webs and with thermally stable PTC resistors. In this connection, the ceramic films may be composed of an insulator ceramic such as, for example, $Al_2O_3$, optionally with a flux added, or of another refractory ceramic, for example based on $ZrO_2$. In the latter case, the PTC resistor and the associated conductor webs must be surrounded by insulation layers.

Various types of PTC temperatures sensors can be produced, depending on the choice of the films used for producing a PTC sensing element for a PTC temperature sensor according to the invention. Preferred PTC temperature sensors which will be described in more detail below can be roughly subdivided into those having temperature sensing elements made of:

(A) Ceramic films based on a insulator ceramic, in particular, based on $Al_2O_3$, and (B) Ceramic films based on a solid electrolyte, a combination of both film types also being optionally possible.

Temperature sensing elements made of ceramic films based on an insulator ceramic Temperature sensing elements of this type are distinguished by the fact that it is possible to dispense with providing insulations between the film, on the one hand, and the PTC resistor and its conductor webs, hereinafter designated resistor track for short, and, on the other hand, in the interconnection holes. Particularly advantageous ceramic films based on an insulator ceramic are those based on $Al_2O_3$ whose use for producing temperature sensors according to the invention is described, by way of example, below.

To produce the resistor tracks, it is possible to use suspensions and pastes based on metal or cermet which can be applied by known application techniques, preferably suspensions and pastes which contain platinum particles or those of other Pt metals as the metal component.

In the simplest manner, a PTC temperature sensing element can consequently be produced, according to the invention, from ceramic films based on $Al_2O_3$, for example, by punching interconnection holes out of a first film, producing interconnections, printing the resistor track or tracks on the film, and laminating onto the first film preferably after printing on an interlaminar binder layer based on $Al_2O_3$, a further ceramic film based on $Al_2O_3$ and sintering.

The sintering is carried out in an advantageous manner by heating for about 3 hours at a temperature of up to 1600° C. If suitable fluxes, preferably silicate-based, for example with an alkaline earth oxide silicate base, are added in an adequate amount, the maximum sintering temperature to be used may also be reduced. This applies in a similar manner to the user of $Al_2O_3$ raw materials with high sintering activity.

The electrical contact areas may advantageously be printed on before carrying out the sintering process, but even after carrying out.

Temperature sensing elements for ceramic films based on a solid electrolyte

Suitable films are known for producing temperature sensing elements of this type. Typically, such films may be composed of about 50 to 90 mol.-% of $ZrO_2$, $CeO_2$, $HfOI_2$ or $ThO_2$ and 50 to 3 mol.-% of $CaO$, $MgO$ or $SrO$ and/or $Yb_2O_3$, $Sc_2O_3$ or other oxides of the rare earths and/or, in particular, $Y_2O_3$. Films of yttrium stabilized $ZrO_2$, so-called YSZ films, which as a rule contain about 4–8 mol.-% of $Y_2O_3$ can be used in a particularly advantageous manner.

Since solid electrolytes of the specified type are easily subject to an electrolytic decomposition as a consequence of an unduly high current loading, it is known to provide an insulation layer, which may be composed, for example, of a ceramic $Al_2O_3$ layer, between resistor tracks and film surface when using films of this type. From British Patent Specification 1,048,069 and EP-A-0,115,148 it is furthermore known to increase the electrical resistance of ceramic materials based on $ZrO_2$, $HfO_2$, $CeO_2$ or $ThO_2$ by incorporating pentavalent metal ions such as, for example, $Nb^{5+}$ and $Ta^{5+}$ ions in the host lattice.

According to an advantageous embodiment of a temperature sensing element according to the invention, an insulating intermediate layer, for example between the resistor track and the solid electrolyte substrate, can consequently also be produced by incorporating pentavalent metal ions such as, for example, $Nb^{5+}$ and $Ta^{5+}$ ions in the solid electrolyte substrate. The formation of such an insulating intermediate layer can be achieved by adding, to the suspension or paste used to form the resistor track, one or more compounds, in particular oxides containing a pentavalent cation or one of higher valency, for example $Nb_2O_5$, which is allowed to diffuse into the solid electrolyte substrate at temperatures of up to 1600° C., preferably 1350 to 1500° C., in the sintering process following the lamination process. Insulating intermediate layers of this type can also be produced in the interconnection holes in a corresponding manner.

To produce the resistor tracks, compounds producing normal resistor tracks can be applied to the insulating layers by normal thick-film technology. According to an advantageous embodiment, pastes base don platinum or based on other Pt metals or on Pt-cermet are used. These pastes can be produced in a known manner using organic binds and/or adhesion promoters, plasticizers and organic solvents.

If it is intended to produce insulating intermediate layers at the same time, fairly small quantities of compounds containing a pentavalent cation or one of higher valency, for example $Nb_2O_5$ may be added to the pastes. Suitable adhesion-promoting additives are, for example, $Al_2O_3$, $ZrO_2$ and silicates.

Interconnection holes can be produced by simply punching them out. The interconnection holes can be insulated, for example, by means of an insulating $Al_2O_3$ intermediate layer or by using a paste of the type described containing a pentavalent cation or one of higher valency.

In an advantageous manner, the laminated composite is formed from two ceramic films, namely a base film having a resistor track printed on by thick-film technology and a second film which hermetically covers the resistor track, and also optionally form insulting layers and a hermetically sealing frame. Optionally, further layers may participate in the construction of the laminated composite, for example adhesion-promoting layers.

Interlaminar binders, for example based on YSZ, may be used to laminate the films together as to form the hermetically sealing frame.

The laminated composite is subsequently sintered, for example by heating for 1 to 10 hours at temperatures from 1350 to 1500° C. After, but optionally even before, carrying out the sintering process, electrical contact areas may be printed on the region of the interconnection holes.

If PTC resistor tracks based on nickel or based on a nickel alloy are used, care should be taken that the sintering temperature is below 1400° C., preferably below 1300° C., when the films are being sintered together. This can be achieved by using films having a comparatively high flux or glass content. Thus, for example, known $Al_2O_3$ films can be used which can be sintered even at temperatures of 900° C. If PTC resistor tracks based on nickel or based on a nickel alloy are used, sintering in an inert atmosphere, preferably a reducing atmosphere, for example an atmosphere composed of 90% $N_2$ and 10% $H_2$, is furthermore necessary.

To produce PTC temperature sensors according to the invention, the temperature sensing elements described are inserted in housings of known construction and designs, for example in those of the type known from German Offenlegungsschrift 3,206,903.

BRIEF DESCRIPTION OF THE DRAWING

The Figures serve to explain the invention more precisely. In detail.

DESCRIPTION OF THE PREFERRED EMBODIMENTS

Figure 1:
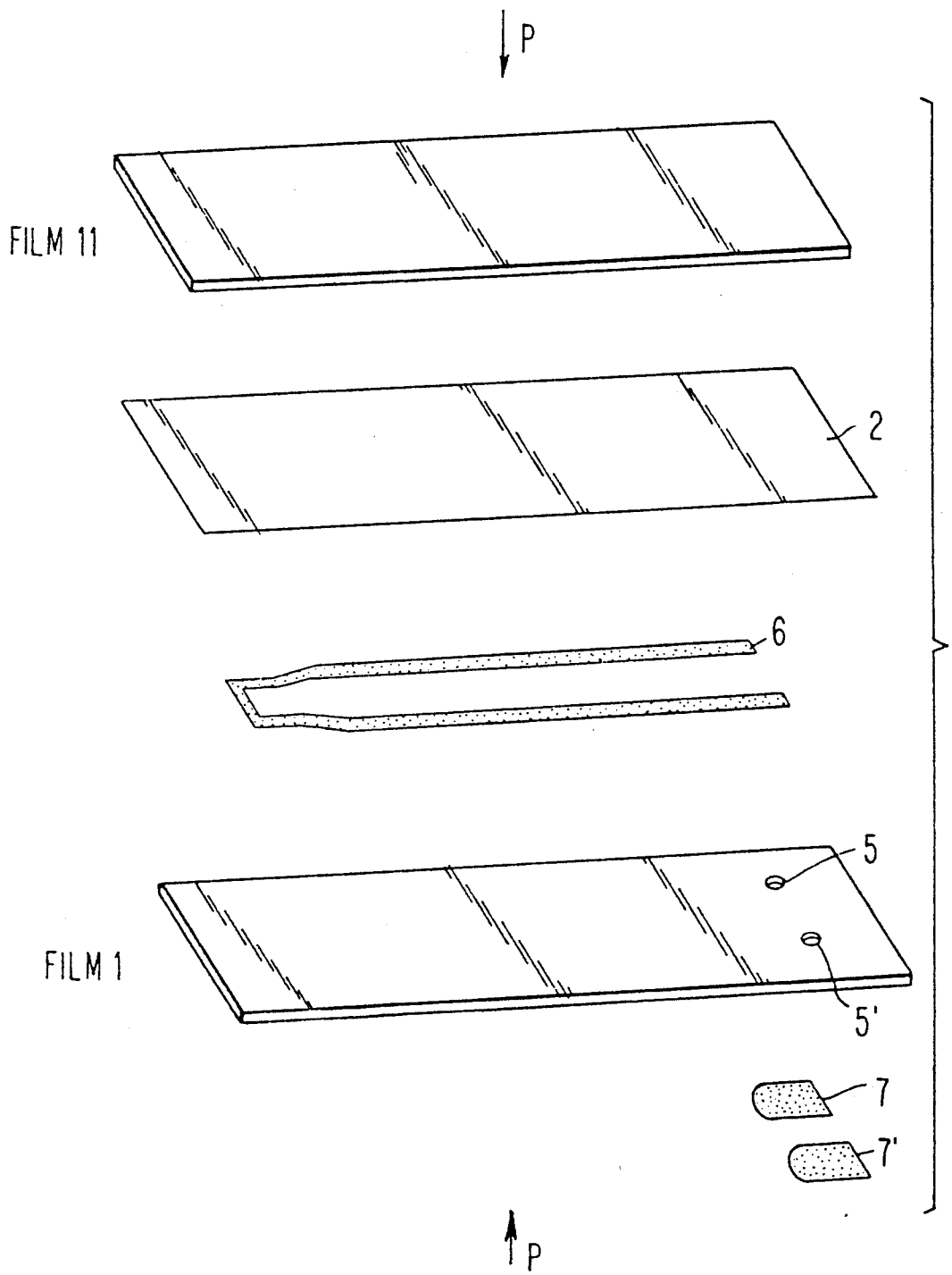
FIG. 1 shows diagrammatically the individual process steps in producing an advantageous embodiment of a PTC temperature sensing element with films based on an insulator ceramic for a PTC temperature sensor according to the invention.

According to FIG. 1, the procedure adopted in producing a first advantageous embodiment of a PTC temperature sensing element for a PTC temperature sensor according to the invention is such that in the steps 1. interconnection holes 5, 5' are punched out of a film identified as film in the drawing 1 based on insulator ceramic and interconnections are produced,
2. a PTC resistor track 6 is printed on the foil or film Film 1 and contact areas 7, 7' on its rear side,
3. an interlaminar binder layer 2 is printed on a foil or film FILM 11 based on an insulator ceramic, and
4. the two films FILM 1 and FILM 11 are laminated together using pressure and elevated temperature, optionally the PTC temperature sensing elements produced in multiples are cut out of the laminate and these are then subjected to a sintering process.

According to a particularly advantageous embodiment of the invention, the films based on an insulator ceramic are ones based on $Al_2O_3$. It has provided advantageous to use films having a layer thickness of 0.1 to 0.6 mm, preferably 0.25 to 0.3 mm.

Optionally, films based on $Al_2O_3$ containing a flux additive with silicate base, for example alkaline earth oxide silicate base or with metastable tetragonal $ZrO_2$ particles of small grain size added to $Al_2O_3$, in which case a very homogenous distribution of the $ZrO_2$ inclusions should result in an increased strength and an improved thermal shock resistance, may furthermore be used. This ceramic has also become known as dispersion-strengthened $Al_2O_3$ ceramic.

Normal PTC resistor pastes can be used to produce the PTC resistor track, in an advantageous manner, $Pt/Al_2O_3$-cermet pastes, for example containing Pt or a Pt alloy, the remainder being $al_2O_3$, A $Pt/Al_2O_3$-cermet paste can be used in an advantageous manner to produce the resistor track, the interconnections and the contact areas.

Figure 2:
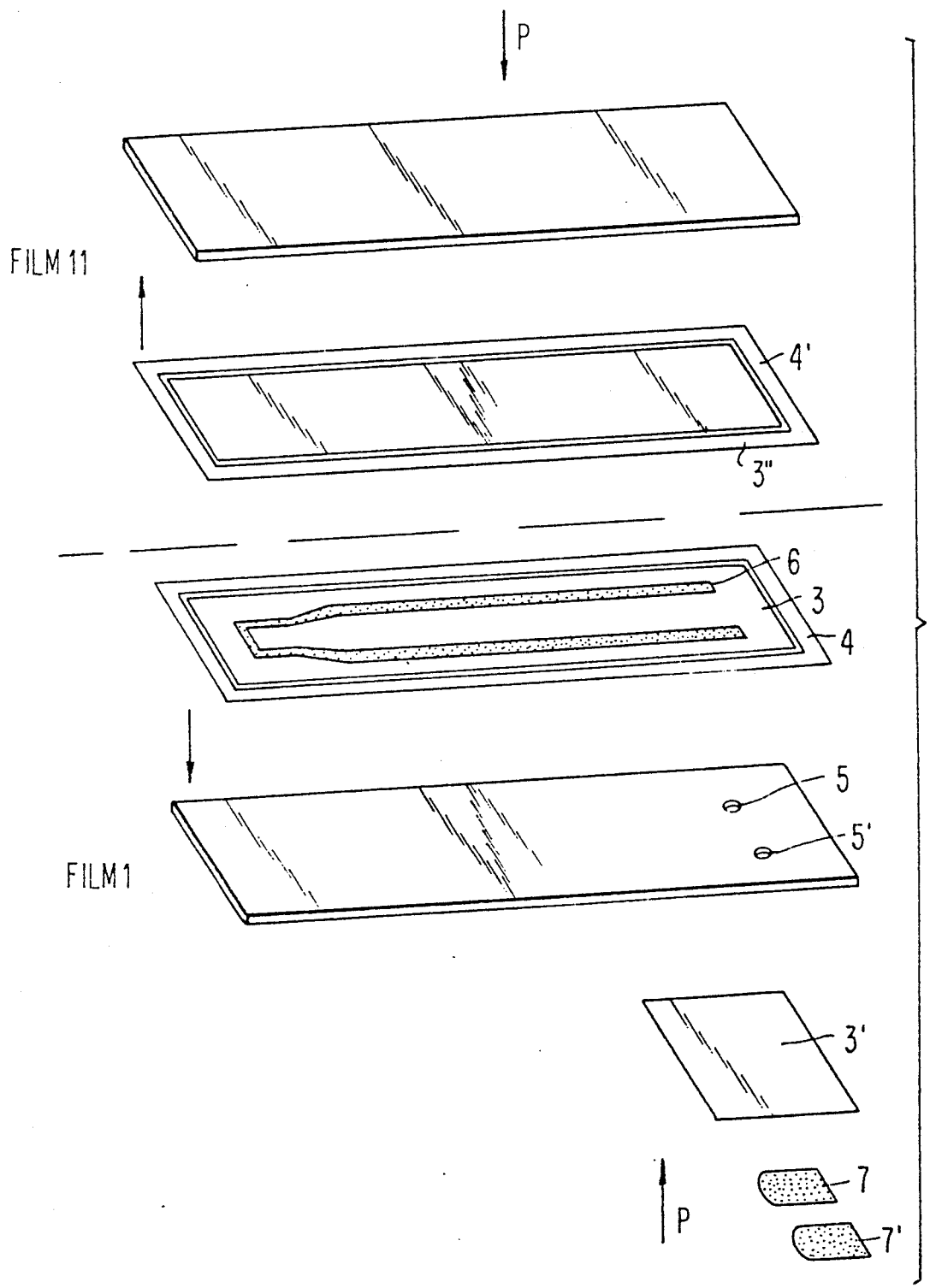
FIG. 2 shows diagrammatically the individually process steps in producing a second advantageous embodiment of a PTC temperature sensing element with solid electrolyte films for a PTC temperature sensor according to the invention.

According to FIG. 2, the procedure adopted in producing a second advantageous embodiment of a PTC temperature sensing element from films based on a solid electrolyte is such that in the steps 1. an insulation layer 3 and a hermetically sealing frame 4 are printed on a ceramic film Film 1 based on a solid electrolyte and an insulating film 3' is also printed on its rear side (in the region of the contacts to be printed on later),
2. Interconnection holes 5, 5' are punched out and interconnections are produced,
3. a PTC resistor track 6 is printed on the insulating layer 3,
4. the rear side of the film Film 1 is provided with contact areas 7, 7', and
5. a second ceramic foil or film Film 11 based on a solid electrolyte on which an insulation layer 3" and a hermetically sealing frame 4' have previously been printed, is applied to the front side of the film Film 1 and the films are laminated together, optionally the PTC temperature sensing elements produced in multiples are cut out of the laminate and these are then subjected to a sintering process.

This procedure may be modified in various ways. Thus, it is possible, for example, to produce an intermediate insulating layer and an electrical conductor in the punched-out interconnecting holes 5, 5' in one operation by depositing a paste composed of a conductor, for example platinum, and a compound containing a pentavalent cation or one of higher valency, for example $Nb_2O_5$, in the interconnection holes. It is also possible to laminate a ceramic film Film 11 without insulating layer 3" an without sealing frame 4' onto the front side of the ceramic foil or film Film 1 with the printed-on resistor track 6 if said layer and said frame have been printed onto the film Film 1 beforehand.

In an advantageous manner, the solid electrolyte ceramic film is one based on YSZ, advantageously having a thickness of 0.1-0.6 mm. The insulating layers are composed in an advantageous manner of $Al_2O_3$ layers. A paste composed of platinum particles and $Al_2O_3$ particles can be used in an advantageous manner to produce the PTC resistor web 6 and the contact areas 7,7'. An interlaminar binder, for example based on YSZ, is preferably suitable for forming the hermetically sealing frame.

In producing a further advantageous embodiment of a PT temperature sensing element from films base on a solid electrolyte, the procedure as shown diagrammatically in FIG. 1 is adopted, but this time in the following step:

1. interconnection holes 5, 5' are punched in a ceramic film Film 1 based on a solid electrolyte,
2. an electrical conductor which contains a compound containing a pentavalent cation or one of higher valency to produce electrically insulating intermediate layers or regions during the sintering process, is deposited in the interconnection holes,
3. the resistor track 6, which likewise contains a compound of the type described for the reason cited under step 2, is printed on the front side of the film FILM 1 by screen-printing technology,
4. the contact areas 7, 7', which again contain a compound of the specified type for the reason specified under step 2, are printed on the rear side of the film FILM 1,
5. a second ceramic film FILM 2 on which an interlaminar binder layer 2 based on YSZ has been printed beforehand, is placed on the front side of the film FILM 1, and FILM 1 and FILM 11.
6. the two films are laminated together, optionally the sensing elements produced in multiples are cut from the laminate and these are sintered.

This further advantageous embodiment consequently differs from the second embodiment described previously essentially in that insulation layers for the purpose of insulating the resistor track with respect to the ceramic films are dispensed with. This is made possible by the fact that a printing paste composed of metal particles, for example platinum, and of a compound containing a pentavalent cation or one of higher valency, for example $Nb_2O_5$ and, furthermore, optionally a ceramic component, for example $Al_2O_3$ is used to produce the resistor track.

This procedure can also be modified. Thus, it is possible, for example, to form the interconnections together with the printing on of the resistor track and the provision of the contact areas 7, 7'.

The resistor track may in all cases be constructed in an advantageous manner, for example, also in meander form. The sintering temperature is advantageously in the range from 1350–1650° C., or even less, if resistor tracks based on Ni - or Ni alloys are used, with sintering times of 1 to 10 hours.

EXAMPLE 1

To produce a first embodiment of a PTC temperature sensing element according to the invention from two $Al_2O_3$ ceramic films, the procedure shown diagrammatically in FIG. 1 was adopted. Two films each having a thickness of 0.3 mm were used. Interconnection holes were first punched in the base film. To produce the interconnections, a $Pt/Al_2O_3$ paste was sucked through the holes. A resistor track composed of $Pt/Al_2O_3$ cermet was then printed on the front side of the film. Then contact areas composed of $Pt/Al_2O_3$ cermet were printed on the rear side of the film in the region of the interconnection holes. Subsequently, an interlaminar binder layer based on $Al_2O_3$ was printed on the front side of the film. The second $Al_2O_3$ ceramic film was then applied to the film printed in this way, after which the films were laminated together and sintered. The sintering temperature was about 1600° C. The duration of sintering was 3 hours.

It was possible to insert the temperature sensing element obtained successfully into a housing of the type known from German Offenlegungsschrift 3,206,903 and to use it for measuring the temperature of exhaust gases from internal combustion engines.

EXAMPLE 2

To produce a further PTC temperature sensing element according to the invention, the procedure shown diagrammatically in FIG. 2 was adopted as follows:

Two ceramic films FILM 1 and FILM 11 based on YSZ each having a thickness of 0.3 mm were used. In a first process stage, an Al₂O₃ insulating layer 3 and a hermetically sealing frame composed of an interlaminar binder based on YSZ were printed on the base film FILM 1 and an Al₂O₃ insulating layer was also printed on the rear side of the film (in the region of the contacts to be printed later), after which interconnection holes 5 and 5' were punched out and were provided with an Al₂O₃ insulating layer and also an electrically conducting Pt/Al₂O₃ cermet layer on top thereof.

In a further process stage, the PTC resistor track 6 composed of Pt/Al₂O₃, optionally in meander form, were printed on the insulating layer 3 of the base film FILM 1.

Electrical contact areas 7 and 7' composed of Pt/Al₂O₃ were printed on the rear side of the base film FILM 1.

An Al₂O₃ insulating layer and also a hermetically sealing frame 4' based on YSZ were simultaneously printed on the ceramic film FILM 11. It was also possible, on the other hand, to print the Al₂O₃ insulating layer on the film FILM 1 instead of on the ceramic film FILM 11.

After forming the composite body by mutual lamination, the body was sintered by heating for 4 hours at a temperature in the region of 1400° C.

The PTC temperature sensor obtained was inserted in a housing of the type known from German Offenlegungsschrift 3,206,903 and used to measure the temperature of exhaust gases from internal combustion engines.

EXAMPLE 3

To produce a third embodiment of a PTC temperature sensing element from ceramic films based on a solid electrolyte for a temperature sensor according to the invention, the procedure shown diagrammatically in FIG. 1 was adopted. As a departure from the materials described in Example 1, however, other materials were used. This time, two ceramic films FILM 1 and FILM 11 based on YSZ each having a thickness of 0.3 mm were used.

Interconnection holes 5 and 5' were first punched in the ceramic foil or film Film 1. To form the interconnections, a platinum-cermet paste of the following composition:

85 parts by weight of Pt powder,
12.5 parts by weight of Nb₂O₅ powder,
2.5 parts of weight of Al₂O₃ powder, was deposited in the punched-out holes. The resistor track 6 was now printed on the front side of the film FILM 1 by screen-printing technology starting from a Pt paste such as was used to produce the interconnections, and the contact areas 7, 7' were applied to the rear side using the same paste.

The procedure was then as described in Example 2, but with the exception that no Al₂O₃ insulating layer was printed on the film FILM 11 and an interlaminar binder layer 2 based on YSZ was deposited over the whole surface instead of the hermetically sealing YSZ sealing frame.

The PTC temperature sensing element obtained was inserted in a housing of the type known from German Offenlegungsschrift 3,206,903 and used to measure the temperature of exhaust gases from internal combustion engines.

What is claimed is:

1. A process for producing a PTC temperature sensing element for a PTC temperature sensor, comprising the steps of providing a first ceramic film based on an insulator ceramic; punching interconnection holes in the first ceramic film; printing contact areas in the region of the interconnection holes; printing the other side of the film with a PTC resistor track; and laminating the film and sintering the film with a second film based on an insulator ceramic in a manner such that the PTC resistor track is hermetically encapsulated with respect to a gas being measured and ambient air.

2. A process as defined in claim 1, wherein the first ceramic film is based on Al₂O₃.

3. A process as defined in claim 1, wherein the second film is based on Al₂O₃.

4. A process of producing a PTC temperature sensing element for a PTC temperature sensor, comprising the steps of providing a first solid electrolyte ceramic film; depositing insulating layers on both sides of the solid electrolyte ceramic film; punching interconnection holes in the solid electrolyte ceramic film; printing a PTC resistor track on one of the insulating layers and printing contact areas on the other of the insulating layers in the region of the interconnection holes; depositing on the side of the film printed with the PTC resistor track a second solid electrolyte ceramic film having a previously deposited insulating layer and also a hermetically sealed frame; and laminating the films together and sintering in a manner such that the PTC resistor track is hermetically encapsulated with respect to a gas being measured and to ambient air.

5. A process as defined in claim 4, and further comprising the steps of providing special insulating layers between the solid electrolyte films and the resistor track in the interconnection holes and beneath the contact areas.

6. A process as defined in claim 5, wherein the resistor track, the interconnections and the contact areas are produced of a material selected from the group consisting of a paste and suspension and containing an addition of a material selected from the group consisting of an oxide, a mixed oxide, a salt and an organometallic compound of a pentavalent metal or one of the higher valency from which a pentavalent cation or one of high valency diffuses into the solid electrolyte ceramic film at a sintering temperature to form the insulating regions in the solid electrolyte ceramic films.

7. A process as defined in claim 6, wherein the paste and suspension each contain an addition of Nb₂O₃.

8. A process as defined in claim 6, wherein the ceramic films have a starting point with a thickness of 0.1 to 0.6 mm.

* * * * *